3,528,878
RUBBER-FABRIC BONDED STRUCTURE AND METHOD OF MAKING SAME
Hyman R. Lubowitz, Redondo Beach, and Eugene A. Burns, Palos Verdes Peninsula, Calif., assignors to TRW Inc., Redondo Beach, Calif., a corporation of Ohio
No Drawing. Filed Aug. 26, 1966, Ser. No. 575,252
Int. Cl. B32b 27/26, 31/26; C08g 33/10
U.S. Cl. 161—188                          9 Claims

ABSTRACT OF THE DISCLOSURE

A chain extended polydiene having a peroxide free radical initiator dispersed therethrough bonds rubber to fabric upon being cured to a hard, strong resin. The polydiene may be selected from 1,2-polydiene or 3,4-polyisoprene.

---

The new adhesive systems, according to this invention, form exceptional bonds between rubber and fabric because of direct chemical interaction with the rubber and improved wettability of fabrics through chain extension of low molecular weight prepolymers prior to forming rigid matrices. The thermosetting cross-linked, cyclized polydiene resin adhesives of this invention belong to the family of resins characterized by the cross-linked, linearly-extended chains of condensed cycloaliphatic groups discussed in co-pending U.S. 3,431,235 issued Mar 4, 1969; applications Ser. No. 570,171 filed Aug. 4, 1966; Ser. No. 563,975, filed July 11, 1966; Ser. No. 565,074, filed July 14, 1966. It is to be understood that, the polyether copolymers, the hydrocarbon copolymers, and the internally plasticized forms described in these co-pending applications and patent may be incorporated in the practice of this invention as well as the described chain extenders and peroxide free radical initiators enumerated therein.

In general, the bonding of rubber to fabric according to this invention, is effected by a thermosetting, cross-linked, condensed cyclized resin which is produced by reacting a mixture of a polyfunctional polydiene prepolymer having mainly pendant vinyl groups on alternate carbon atoms of an elongated backbone carbon chain with a polyfunctional chain extender capable of reacting with the functional groups of the polydiene and a peroxide free radical initiator capable of promoting the cyclization of the pendant vinyl groups and the cross-linking of adjacent chains. Structurally, it is believed that these resins are comprised mainly of blocks of linearly-extended cross-linked chains of condensed cycloaliphatic rings which have chemically interacted partially with the olefinic unsaturation in the rubber compound.

Polydiene prepolymers used in production of the thermosetting adhesive resins of this invention should have predominantly pendant vinyl groups on alternate carbon atoms of the backbone carbon chain, preferably constituting at least 80% of the olefinic unsaturation, and should preferably have a molecular weight from about 500 to about 3000. The preferred polydiene is 1,2-polybutadiene, although 3,4-polyisoprene is also suitable. Difunctional compounds characterized by terminal substitution are preferred, however, other polyfunctional prepolymers having functional groups located at opposite ends of the molecule, but not necessarily the terminal positions, may be used. While a dihydroxy substituted prepolymer is generally preferred, mainly from the standpoint of ease of reactability, a dicarboxy substituted compound or other polydienic prepolymer having chemically functional groups preferably terminally positioned will also be satisfactory.

Selection of a suitable organic chain extender is dependent upon the functional groups on the prepolymers. Where the functional groups on the prepolymers are hydroxyl, chain extenders should be diisocyanates, diacid halides, diacids, or diesters. Where the functional groups on the prepolymers are carboxyl, the chain extenders should be diepoxides, diimines, diols, and diaziridenes. The aliphatic or aromatic organic chain extenders are preferably difunctional, but may contain more than two functional groups.

Important to the curing steps of the process are the aliphatic and aromatic peroxide free radical initiators. These peroxide initiators are instrumental in the cyclization of the pendant vinyl groups of the polydiene and the cross-linking of adjacent chains. The peroxide initiator is introduced into the initial mixture along with the polydiene prepolymer and the organic chain extender whereupon it becomes molecularly dispersed throughout the ensuing elastomeric polymer. Upon the application of heat in the final step, the peroxide initiator decomposes to provide free radicals which force the pendant vinyl groups to react to form cross-linked, condensed cycloaliphatic chains.

In preparing these resins, the polyfunctional organic chain extender should be mixed in an approximately stoichiometric amount to the polydiene prepolymer. Adjustments are necessary when other ingredients such as copolymeric prepolymers or internal plasticizers are employed, but approximately stoichiometric amounts of the organic chain extender with respect to the prepolymeric ingredients is the preferred quantity. The peroxide is generally employed in an amount within the range of 0.5% to 10% by weight of the prepolymer, and preferably within the range of 2% to 6%. It will be appreciated that larger or smaller amounts of the peroxide may be employed and that the optimum amount is dependent upon, among other things, the particular peroxide initiator used, the polydiene prepolymer employed, and the chain extender selected for the reaction.

After the ingredients have been mixed, the polymeric liquid should desirably be degassed in vacuum to remove entrapped air and volatile impurities. A chain extending reaction proceeds at room temperature or moderately elevated temperatures to produce an elastomeric intermediate material characterized by having the peroxide free radical initiator molecularly dispersed throughout. The chain extension reaction may be catalyzed to reduce reaction temperature or time by catalytic agents which are standard is the art, providing they do not interfere with the subsequent cyclization and cross-linking step. While the polymer is in this elastomeric state it may be easily handled and fabricated. When the final article has been constructed, the rubbery intermediary is heated in the range of 150° F. to 400° F. whereupon cyclization and cross-linking takes place to produce a tough, stiff, transparent plastic. When desired, the hard cross-linked, cyclized resin may be quickly produced by the rapid heating of the reactants to elevated temperatures thereby causing the two reactions to occur simultaneously.

Preparation of the rubber and the fabric is performed by state-of-the-art teachings, which yield material surfaces free of grease and dirt. One procedure which has been proven effective involves cleaning the rubber surface with a high boiling naptha solvent and subsequently buffing. The fabric may be cleaned either with the solvent or detergent and water followed by a thorough rinsing with water. In many cases, chemical pre-treatment procedures which provide for chemical adhesion of the polymeric mixture with the rubber and fabric will markedly enhance the adhesive bond.

The polymeric mixture may be applied to the fabric by any suitable means, e.g. spraying, painting, dipping, or flowing. If the polymeric mixture has a thicker consistency than is desired, solvents can be used to thin the mixture, however, generally they must be removed by volatilization prior to adhering. Alternatively styrene and acetonitrile can be used to reduce the viscosity of the reacting mixture; in this case the styrene or the acetonitrile becomes internally co-reacted when added to the polymeric mixture. Internal co-reactants are advantageous from the standpoint that they act as solvents, yet they do not require removal because they become chemically incorporated into the polymeric structure.

Because of the formation of the intermediate elastomeric material, joining of the rubber and the pre-impregnated fabric may be accomplished simply by pressing the materials together with the application of moderate mechanical pressure, between 10 and 100 p.s.i.g., and elevated temperatures in the range of approximately 150° F. to 400° F. Application of temperatures in this range effect a dual purpose of curing the resin and vulcanizing the rubber. Thus, it is apparent that the fabric can be impregnated with the polymeric material and reacted to the tack-free intermediate elastomeric stage at one site and then shipped to another site where fabrication is completed by the mere application of heat and pressure. This procedure circumvents the inconvenience normally associated with the application of resin adhesives, and the final fabricator works with a material which is clean and substantially odor-free.

The time required for the final bond to form will vary according to resin formulation and temperature. The bonding time is governed by the period required to effect a full cure of the cyclized polydiene resin. Generally this time may vary from approximately ten seconds to ten minutes.

It can be appreciated that the described adhesive resin can provide greater versatility than heretofore possible due to the step-wise curing property. In addition to the attractive features, such as, chemical interaction with the rubber and improved wettability of the fabric through chain extension of the prepolymers, the final adhesive resin exhibits excellent oxidative, chemical, water, and thermal stability. Such properties are attractive where the adhesive is to be used to bond cord plies to the rubber in rubber tires or a cloth reinforcing to the rubber in a rubber hose.

We claim.
1. A method for bonding rubber to fabric comprising:
   (I) applying to a fabric a polymeric mixture comprising (A) a polydiene having (1) polyfunctional groups consisting of hydroxyl and carboxyl and (2) a predominant amount of vinyl groups on alternate carbon atoms of the polydiene backbone, (B) a chain extender capable of reacting with the functional groups on the polydiene, and (C) a peroxide free radical initiator dispersed therethrough substantially unreacted,
   (II) reacting the mixture to form an elastomeric impregnated fabric; and
   (III) curing the elastomeric impregnated fabric in contact with a rubber surface whereby a hard, strong resin bond is formed.
2. A method according to claim 1 wherein the polydiene is selected from the group consisting of 1,2-polybutadiene and 3,4-polyisoprene.

3. A method according to claim 1 wherein the chain extender capable of reaction with the hydroxyl functional groups on the polydiene is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

4. method according to claim 1 wherein the chain extender capable of reaction with the carboxyl functional groups on the polydiene is selected from the group consisting of (a) diepoxide substituted aliphatic compounds, (b) diepoxide substituted aromatic compounds, (c) diimine substituted aliphatic compounds, (d) diimine substituted aromatic compounds, (e) dihydroxyl substituted aliphatic compounds, (f) dihydroxyl substituted aromatic compounds, (g) diaziridene substituted aliphatic compounds, and (h) diaziridene substituted aromatic compounds.

5. A method according to claim 1 wherein the polymeric mixture contains in addition to the polydiene, a polymeric material selected from the group consisting of polyethers and hydrocarbons.

6. A bonded article comprising a rubber layer bonded to a fabric layer by a hard, strong resin produced by reacting a polymeric mixture containing (A) a polydiene having (1) polyfunctional groups consisting of hydroxyl and carboxyl and (2) a predominant amount of vinyl groups on alternate carbon atoms of the polydiene backbone, (B) a chain extender capable of reacting with the functional groups on the polydiene, and (C) a peroxide free radical initiator.

7. An article according to claim 6 wherein the polydiene is selected from the group consisting of 1,2-polybutadiene and 3,4 polyisoprene.

8. An article according to claim 6 wherein the chain extender capable of reaction with the hydroxyl functional groups on the polydiene is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

9. An article according to claim 6 wherein the chain extender capable of reaction with the carboxyl functional groups on the polydiene is selected from the group consisting of (a) diepoxide substituted aliphatic compounds, (b) diepoxide substituted aromatic compounds, (c) diimine substituted aliphatic compounds, (d) diimine substituted aromatic compounds, (e) dihydroxyl substituted aliphatic compounds, (f) dihydroxyl substituted aromatic compounds, (g) diaziridene substituted aliphatic compounds, and (h) diaziridene substituted aromatic compounds.

References Cited

UNITED STATES PATENTS

| | | | |
|---|---|---|---|
| 2,439,514 | 4/1948 | Herndon | 161—190 |
| 2,873,790 | 2/1959 | Cadwell et al. | 161—190 X |
| 2,877,212 | 3/1959 | Seligman | 260—77.5 |
| 3,042,545 | 7/1962 | Kienle et al. | 117—75 |
| 3,055,952 | 9/1962 | Goldberg | 260—77.5 X |
| 3,084,141 | 4/1963 | Kraus et al. | 260—85.1 |
| 3,190,764 | 6/1965 | Cardina | 156—334 X |

(Other references on following page)

UNITED STATES PATENTS

| | | | |
|---|---|---|---|
| 3,217,066 | 11/1965 | Greenspan et al. | 260—836 X |
| 3,411,980 | 11/1968 | Leshin | 161—188 X |
| 2,968,647 | 1/1961 | Koenecke et al. | 260—77.5 |
| 3,135,716 | 6/1964 | Uraneck et al. | 260—93.5 |
| 3,147,313 | 9/1964 | Hsieh | 260—837 |
| 3,203,944 | 8/1965 | Hsieh | 260—94.7 |
| 3,285,949 | 11/1966 | Siebert | 260—77.5 |

FOREIGN PATENTS 1,315,354  12/1962  France.

OTHER REFERENCES

"Product Data Bulletin No. 505," published by Sinclair Petrochemicals, Inc., issued May 1, 1965 (46 pages).

HAROLD ANSHER, Primary Examiner

U.S. Cl. X.R.

156—331, 333, 334; 161—190, 253, 255; 260—2, 47, 66, 75, 77.5, 836, 859 887